US007013597B1

(12) United States Patent
Dominguez

(10) Patent No.: US 7,013,597 B1
(45) Date of Patent: Mar. 21, 2006

(54) TREE RING FOR PREVENTION OF VEGETATION GROWTH AT TRUNKS

(76) Inventor: Oscar Dominguez, 19990 SW. 198th St., Miami, FL (US) 33187

( * ) Notice: Subject to any disclaimer, the term of this patent is extended or adjusted under 35 U.S.C. 154(b) by 0 days.

(21) Appl. No.: 11/007,950

(22) Filed: Dec. 9, 2004

(51) Int. Cl.
*A01G 9/00* (2006.01)
*A47G 7/08* (2006.01)
*A47G 7/07* (2006.01)

(52) U.S. Cl. .............................. 47/32; 47/31.1; 47/33; 47/32.4; 47/32.5

(58) Field of Classification Search .................. 47/32, 47/33, 32.4, 32.5, 32.6, 66.6, 66.7, 25, 84, 47/41.01, 41.1, 41.12, 41.15, 31.1; A47G 7/08, A47G 7/07
See application file for complete search history.

(56) References Cited

U.S. PATENT DOCUMENTS

| | | | | |
|---|---|---|---|---|
| 3,618,260 A | * | 11/1971 | Convey, Jr. ...................... | 47/32 |
| 3,940,884 A | * | 3/1976 | Mason, Jr. ...................... | 47/32 |
| 3,961,443 A | * | 6/1976 | Insalaco ......................... | 47/32 |
| 4,403,443 A | * | 9/1983 | Valente .......................... | 47/32 |
| 4,901,881 A | * | 2/1990 | McElroy ....................... | 220/287 |
| 4,948,009 A | * | 8/1990 | Sawatani ...................... | 220/229 |
| 5,085,001 A | | 2/1992 | Crawley .......................... | 47/25 |
| 5,184,421 A | * | 2/1993 | Meharg ......................... | 47/65.5 |
| D337,077 S | * | 7/1993 | Turley ......................... | D11/164 |
| 5,231,793 A | * | 8/1993 | Allen ............................. | 47/32 |
| 5,279,069 A | * | 1/1994 | Myer ............................. | 47/32 |
| 5,325,627 A | * | 7/1994 | Anderson ....................... | 47/84 |
| 5,425,204 A | * | 6/1995 | Holmes et al. ................. | 47/84 |
| 5,430,971 A | * | 7/1995 | Myer ............................. | 47/32 |
| 5,502,921 A | * | 4/1996 | Hyslop .......................... | 47/32 |
| 5,794,378 A | | 8/1998 | Beatrez ......................... | 47/25 |
| 2001/0035414 A1 | * | 11/2001 | Tyree ........................... | 220/229 |
| 2005/0039389 A1 | * | 2/2005 | Partikian ....................... | 47/30 |

FOREIGN PATENT DOCUMENTS

| | | | | |
|---|---|---|---|---|
| AU | 200111099 A | * | 1/2000 | |
| CA | 2112557 A | * | 3/1994 | |
| CA | 2259482 A | * | 2/1999 | |
| DE | 200215902 U | * | 10/2002 | |
| GB | 2207845 A | * | 2/1989 | |
| JP | 10295191 A | * | 4/1997 | |
| JP | 2002125471 A | * | 10/2000 | |

* cited by examiner

*Primary Examiner*—Peter M. Poon
*Assistant Examiner*—Andrea M. Valenti
(74) *Attorney, Agent, or Firm*—Sanchelima & Assoc., P.A.

(57) ABSTRACT

A tree ring that inhibits and/or prevents vegetation growth around the trunks of trees. The tree ring comprises an elastic outer peripheral edge and an elastic inner peripheral edge. In between elastic outer peripheral edge and the elastic inner peripheral edge is a flexible sheet. The flexible sheet has a plurality of holes. The tree ring is removably secured onto a tree pot of any dimension, size, or shape. The elastic outer peripheral edge stretches around the rim of the tree pot, and the elastic inner peripheral edge snugly fits around a tree trunk. It is noted that the distance between the elastic outer peripheral edge and the elastic inner peripheral edge that makes up flexible sheet may vary.

3 Claims, 2 Drawing Sheets

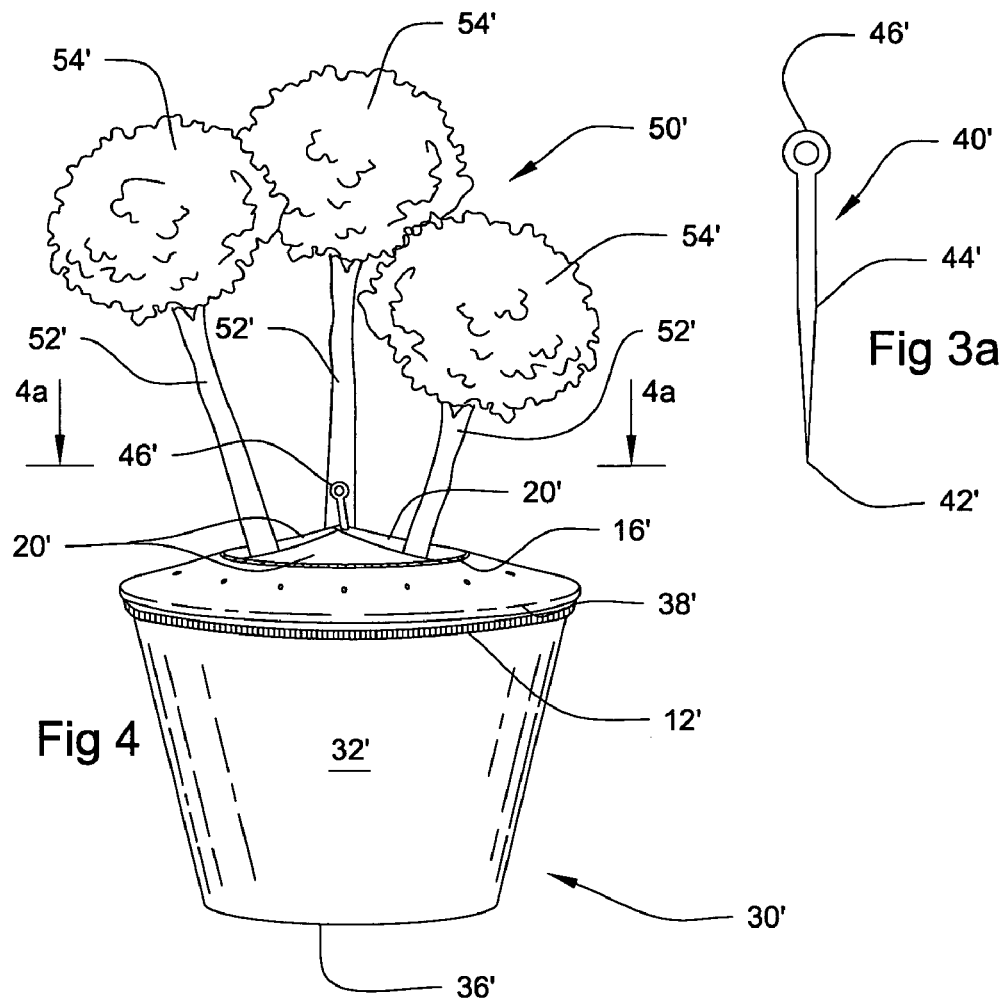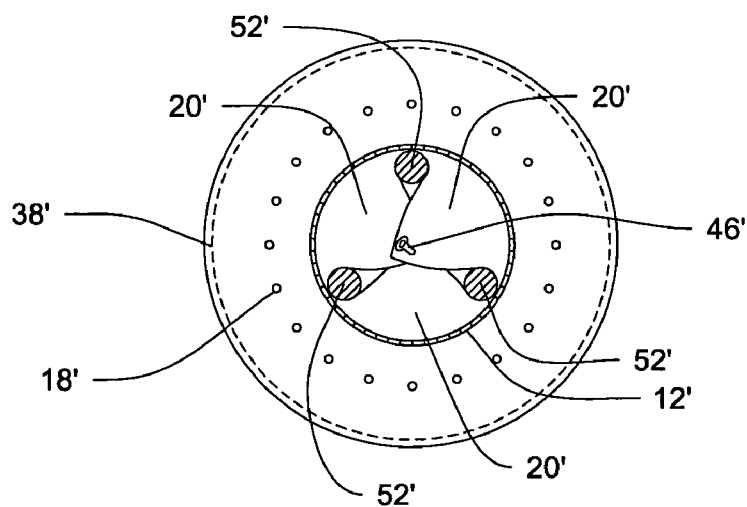

TREE RING FOR PREVENTION OF VEGETATION GROWTH AT TRUNKS

BACKGROUND OF THE INVENTION

1. Field of the Invention

The present invention relates to a device that inhibits or prevents vegetation growth around the tree trunks of trees.

2. Description of the Related Art

Several designs for tree skirts and the like have been designed in the past. None of them, however, include elastic exterior and interior edges to snugly fit onto a tree pot and a tree trunk respectively, for the inhibition or prevention of vegetation growth around the tree trunks of trees.

Applicant believes that the closest reference corresponds to U.S. Pat. No. 5,085,001 issued to Crawley on Feb. 4, 1992 for Stabilized mulch skirt. However, it differs from the present invention because Crawley teaches a mulch skirt for inhibiting the growth of vegetation around a tree or post formed from a single sheet having an initial axial opening and a slit extending from the axial opening to a point on the periphery of the skirt. A plurality of adjustment strips are formed around the axial opening by successive concentric rows of serrations. The mulch skirt can be custom-sized on the site to fit around a selected tree or post by removing an inner peripheral portion of the mulch skirt along a selected row of serrations corresponding in diameter to the base diameter of the tree or post with which the mulch skirt is to be used. The mulch skirt may be stabilized by a ring extending around the periphery of the skirt and by anchor pins fastening the ring to the ground.

Applicant believes that another reference corresponds to U.S. Pat. No. 5,794,378 issued to Beatrez on Aug. 18, 1998 for Tree edging. However, it differs from the present invention because Beatrez teaches a landscape device positionable at the base of a tree or other vertical object. The device includes a resilient rigid main body with an outer peripheral periphery. The device is constructed of a single, molded sheet of resilient rigid plastic enclosing a central opening and a radial slit extending from the opening to an outer peripheral periphery of the main body. The device further includes two upwardly extending annular walls integral with the main body, a plurality of radial slits extending from the central opening, and an annular flange integral with the main body at one of the annular walls for anchoring the main body into the earth.

Other patents describing the closest subject matter provide for a number of more or less complicated features that fail to solve the problem in an efficient and economical way. None of these patents suggest the novel features of the present invention.

SUMMARY OF THE INVENTION

A tree ring, comprising a flexible sheet having an elastic outer peripheral edge and a substantially centrally located through opening defining an elastic inner peripheral edge. The flexible sheet has a plurality of holes; and a tree pot for holding a tree having a trunk. The tree pot comprises a sidewall having a rim and a base. The elastic outer peripheral edge stretches around the rim of the tree pot. The elastic inner peripheral edge snugly fits around the trunk to inhibit and/or prevent vegetation growth around the trunk.

The flexible sheet may overlap itself initially to allow the tree to grow tall while the elastic outer peripheral edge remains stretched around the rim of the tree pot and the elastic inner peripheral edge remains snugly fitted around the trunk. The flexible sheet serves as a surface to sustain fertilizer. The fertilizer is placed upon the flexible sheet to dissolve slowly for fertilizing the tree. The holes are of a predetermined dimension to allow water and the fertilizer to seep through, but not large enough to allow direct sunlight to shine upon soil within the tree pot. The elastic inner peripheral edge has a plurality of arms that extend towards each other and are staked within the tree pot. The inhibition and/or prevention of vegetation growth around the trunk is accomplished without chemicals.

It is therefore one of the main objects of the present invention to provide a tree ring that inhibits and/or prevents vegetation growth around the tree trunks of trees.

It is another object of this invention to provide a tree ring that remains snugly secured as the tree grows.

It is still another object of the present invention to provide a tree ring that does not allow direct sunlight to shine upon soil within a tree pot.

It is still another object of the present invention to provide a tree ring that allows water and fertilizer to seep into the tree pot.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3a represents a perspective view of a pin used with the alternate embodiment of the instant invention illustrated in FIG. 3.

FIG. 4 shows an isometric view of the alternate embodiment secured onto a tree pot.

FIG. 4a shows cut view taken along the line 4a–4a seen in FIG. 4.

DETAILED DESCRIPTION OF THE PREFERRED EMBODIMENT

Figure 1:
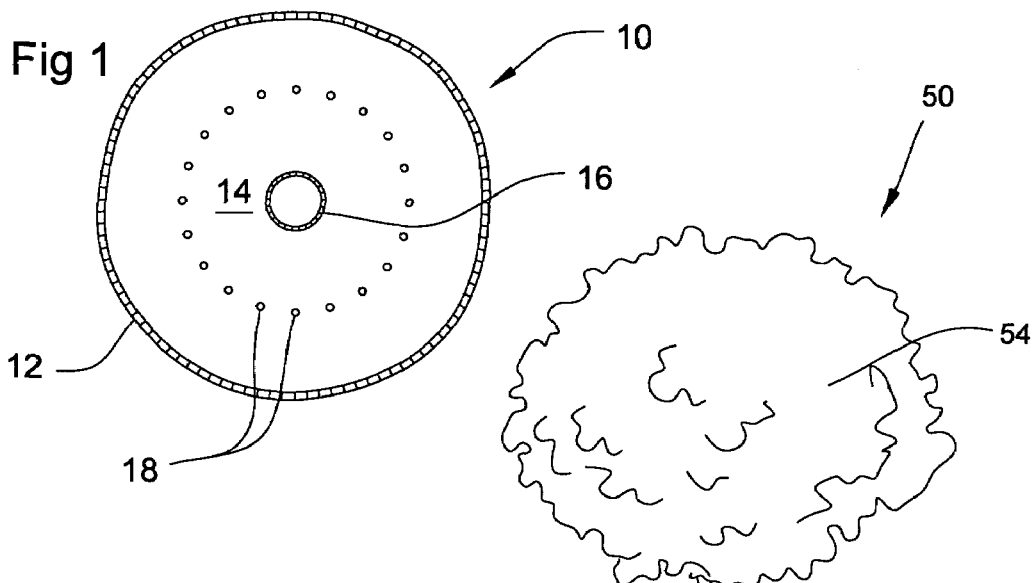
FIG. 1 represents a perspective view of the instant invention.

Referring now to the drawings, the present invention is generally referred to with numeral 10, defining a tree ring.

As seen in FIG. 1, instant invention 10 comprises elastic outer peripheral edge 12 and elastic inner peripheral edge 16. In between elastic outer peripheral edge 12 and elastic inner peripheral edge 16, is flexible sheet 14. Flexible sheet 14 has a plurality of holes 18.

Figure 2:
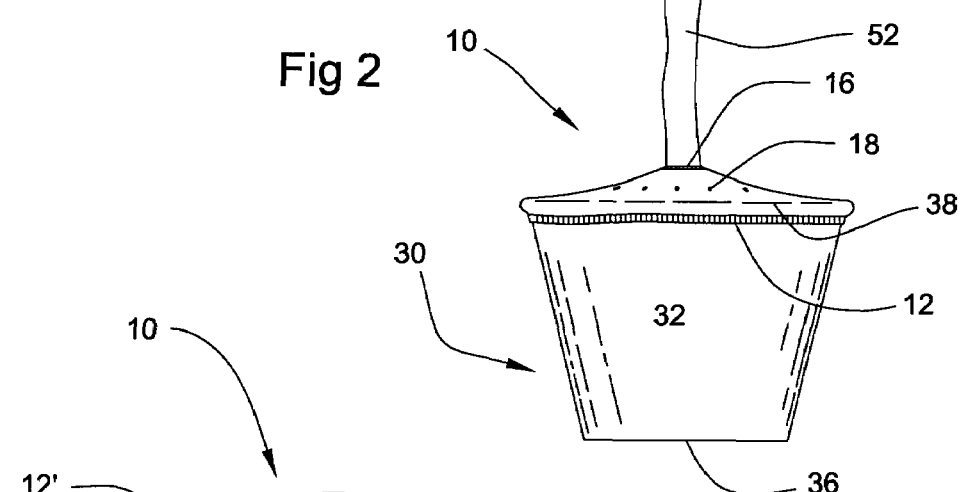
FIG. 2 shows an isometric view of the instant invention secured onto a tree pot.

As seen in FIG. 2, instant invention 10 is removably secured onto tree pot 30. Tree pot 30 comprises sidewall 32 having rim 38 and base 36. It is noted that tree pot 30 can be of any dimension, size, or shape. In the preferred embodiment, tree pot 30 holds tree 50 that has a single trunk 52 that may have foliage 54. As seen in this illustration, elastic outer peripheral edge 12 stretches around rim 38 of tree pot 30, and elastic inner peripheral edge 16 snugly fits around trunk 52. It is noted that the distance between elastic outer peripheral edge 12 and elastic inner peripheral edge 16 that makes up flexible sheet 14 may vary.

In the preferred embodiment, a predetermined amount of flexible sheet 14 may overlap itself initially when elastic outer peripheral edge 12 is stretched around rim 38 of tree pot 30, and elastic inner peripheral edge 16 is snugly fitted around trunk 52. The overlap of flexible sheet 14 allows tree 50 to grow tall while elastic outer peripheral edge 12 remains stretched around rim 38 of tree pot 30, and elastic inner peripheral edge 16 remains snugly fitted around trunk 52.

As previously mentioned, flexible sheet 14 has a plurality of holes 18. Flexible sheet 14 serves as a surface to sustain fertilizer. For optimal results in tree 50 growth, fertilizer is placed upon flexible sheet 14. It is noted that fertilizer will dissolve slowly to fertilize tree 50. Holes 18 are of a predetermined dimension to allow water and fertilizer to seep through, but are not large enough to allow direct sunlight to shine upon soil, not seen, within tree pot 30. The absence of direct sunlight inhibits and/or prevents vegetation growth around trunk 52. It is also noted that instant invention 10 does not require the use of chemicals to inhibit and/or prevent vegetation growth around trunk 52.

Figure 3:
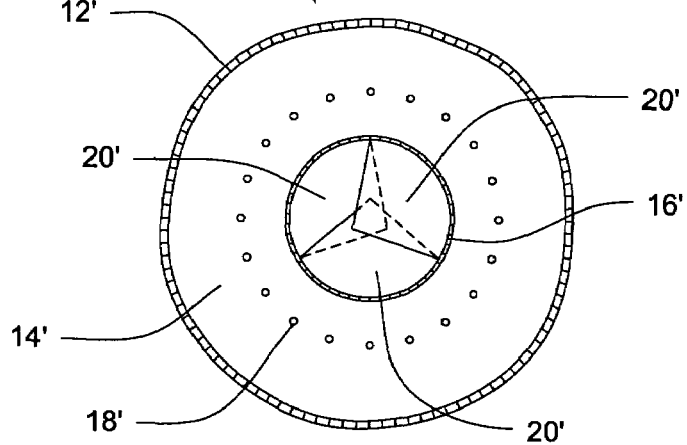
FIG. 3 represents a perspective view of an alternate embodiment of the instant invention.

Seen in FIG. 3 is an alternate embodiment of instant invention 10, comprising elastic outer peripheral edge 12' and elastic inner peripheral edge 16'. In between elastic outer peripheral edge 12' and elastic inner peripheral edge 16', is flexible sheet 14'. Flexible sheet 14' has a plurality of holes 18'. Extending inwardly from elastic inner peripheral edge 16' are a plurality of arms 20'.

Seen in FIG. 3a is pin 40' comprising tip 42' at the end of shaft 44'. Pin 40' also has handle 46'. Pin 40' is used with the alternate embodiment seen in FIG. 3.

As seen in FIGS. 4 and 4a, instant invention 10 is removably secured onto tree pot 30'. Tree pot 30' comprises sidewall 32' having rim 38' and base 36'. It is noted that tree pot 30' can be of any dimension, size, or shape. In an alternate embodiment, tree pot 30' holds tree 50' that multiple trunks 52' that may have foliage 54'. As seen in this illustration, elastic outer peripheral edge 12' stretches around rim 38' of tree pot 30', and elastic inner peripheral edge 16' fits around all of trunks 52'. It is noted that the distance between elastic outer peripheral edge 12' and elastic inner peripheral edge 16' that makes up flexible sheet 14' may vary.

In the alternate embodiment, a predetermined amount of flexible sheet 14' may overlap itself initially when elastic outer peripheral edge 12' is stretched around rim 38' of tree pot 30', and elastic inner peripheral edge 16' is fitted around trunks 52'. The overlap of flexible sheet 14' allows tree 50' to grow tall while elastic outer peripheral edge 12' remains stretched around rim 38' of tree pot 30', and elastic inner peripheral edge 16' remains fitted around trunks 52'.

As previously mentioned, flexible sheet 14' has a plurality of holes 18'. Flexible sheet 14' serves as a surface to sustain fertilizer. For optimal results in tree 50' growth, fertilizer is placed upon flexible sheet 14'. It is noted that fertilizer will dissolve slowly to fertilize tree 50'. Holes 18' are of a predetermined dimension to allow water and fertilizer to seep through, but are not large enough to allow direct sunlight to shine upon soil, not seen, within tree pot 30'. The absence of direct sunlight inhibits and/or prevents vegetation growth around trunk 52'. It is also noted that instant invention 10 does not require the use of chemicals to inhibit and/or prevent vegetation growth around trunk 52'.

In the alternate embodiment, arms 20' extend toward the center of tree pot 30' around trunks 52', minimizing the amount of soil, not seen, that can be exposed to direct sunlight. Pin 40' is used to stake each of arms 20' into the soil within tree pot 30'.

Instant invention 10 is manufactured from a durable, weather resistant material and can be recycled for multiple uses.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A tree ring, comprising;
   A) a flexible sheet having an elastic outer peripheral edge and a substantially centrally located through opening defining an elastic inner peripheral edge, said flexible sheet having a plurality of holes and approximately on a horizontal plane, said flexible sheet serves as a surface to sustain fertilizer, said fertilizer is placed upon said flexible sheet to dissolve slowly for fertilizing said tree, said holes are of a predetermined dimension to allow water and said fertilizer to seep though, but not large enough to allow direct sunlight to shine upon soil within said tree pot; and,
   B) said tree pot for holding a tree having a trunk, comprising a sidewall having a rim and a base, said elastic outer peripheral edge stretches around said rim of said tree pot, and said elastic inner peripheral edge snugly fits around said trunk to inhibit and/or prevent vegetation growth around said trunk, said elastic inner peripheral edge has a plurality of arms that extend towards each other and are staked within said tree pot.

2. The tree ring according to claim 1, further characterized in that a predetermined amount of said flexible sheet may overlap itself initially to allow said tree to grow tall while said elastic outer peripheral edge remains stretched around said rim of said tree pot, and said elastic inner peripheral edge remains snuggly fitted around said trunk.

3. The tree ring according to claim 2, further characterized in that said inhibit and/or prevent vegetation growth around said trunk is accomplished without chemicals.

* * * * *